Nov. 22, 1955 A. W. HOGAN 2,724,737

ELECTRIC COLOR IMAGE FORMATION AND CONTROL

Filed Jan. 29, 1951 2 Sheets-Sheet 1

INVENTOR.

Alsede W. Hogan

Nov. 22, 1955 A. W. HOGAN 2,724,737

ELECTRIC COLOR IMAGE FORMATION AND CONTROL

Filed Jan. 29, 1951 2 Sheets-Sheet 2

*INVENTOR.*

Aloede W. Hogan 2,724,737

ELECTRIC COLOR IMAGE FORMATION AND CONTROL

Alsede W. Hogan, Berwyn, Md.

Application January 29, 1951, Serial No. 208,415

12 Claims. (Cl. 178—5.4)

This invention relates generally to image formation and control systems and more particularly to the formation of a composite image through the sequential combination of component images produced on the fluorescent screens of image photo-tubes. The invention is particularly useful in the formation of full color images through the dissection and recombination of primary color images in individual image phototubes.

Prior art devices for the production of sequential color images which can be controlled and transmitted and therefore utilized in color television have suffered from certain disadvantages. The manner in which the image of the full color object is broken down into its primary color component images for transmission and then recombined upon reception to produce a full color image has required mechanical and electrical devices which have not been altogether satisfactory. In the field sequential system, for example, it is well known to rotate a three color disc in the optical path of a television camera and by rotating a similar disc before the viewing screen of the receiver and having the two discs synchronized produce a full color image. Such a system suffers from inherent mechanical difficulties and is limited to receivers having relatively small viewing screens.

In the line sequential system separate primary color images are produced in a row across the sensitive screen of the camera tube. At the receiver these images are produced on a single tube side by side with each image falling on a color phosphor corresponding to its primary color. These images are then recombined by an optical system to produce the full color image. Because these areas must be linearly scanned at the transmitter and receiver the possibility of improper superposition exists with the resultant inferior full color image.

The dot sequential system utilizes a separate camera tube at the transmitter and a separate cathode ray tube at the receiver for each primary color. To obtain proper registration it is necessary that the scanning of each of the six tubes involved be done very accurately and the possibility of a poor color image is enhanced by the multiplicity of synchronized scanning circuits involved.

The present invention provides means which can be utilized to produce a full color image in accordance with any of the prior art sequential systems hereinbefore described and overcomes many of the attendant disadvantages associated with the particular system with which it is used. Furthermore the system of the present invention is not limited in application to those prior art systems described but is of general utility in producing a composite image whenever it is desired to form such an image by superposition of two or more basic or component images.

The present invention provides an image phototube for each component of a composite image which is to be controlled. Means are provided for sequentially energizing the electron lens systems of the phototubes in the order in which selection of the components is desired. The desired component images then appear on the fluorescent screens of the phototubes and can be combined optically to produce the desired composite image.

It is an object of this invention to provide means for the formation and control of composite images.

Another object of this invention is to provide a system for forming a full color image from primary color component images.

A further object of this invention is to provide an image dissector for obtaining selected image portions of a desired view.

Another object of this invention is to provide a color television system employing image phototubes for primary color selection and control.

A further object is to provide a system in which individual image phototubes are successively energized to produce component images of a view in time sequence suitable for producing modulated signals in accordance therewith and in which means are provided whereby the signals are utilized and other image phototubes are synchronously energized and utilized to provide a composite image of the view.

Other objects and many attendant advantages of the present invention will become apparent to those skilled in the art as a better understanding of the invention is obtained by reference to the following detailed description and accompanying drawings wherein.

Figure 1:
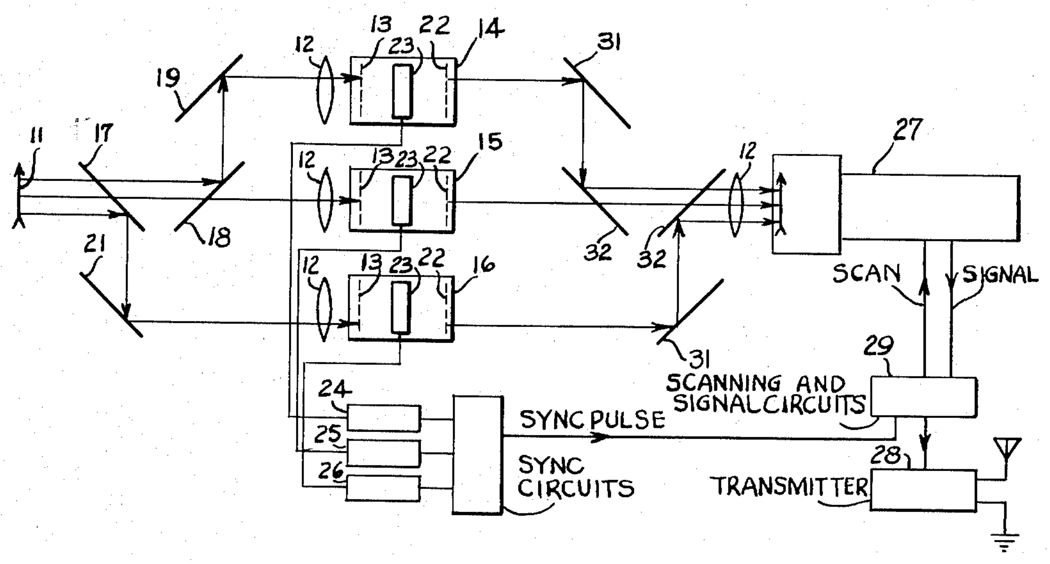
Fig. 1 is a block diagram of the system of the invention adapted to produce sequential primary color signals for television transmission.

Referring now to the drawings in which like characters of references are used to designate like parts throughout the views and more particularly to Fig. 1 thereof there is shown an object 11 which is to be televised in full color. A suitable optical system including lenses 12 focusses images of the object 11 on the respective photocathodes 13 of the image phototubes 14, 15 and 16. For color television purposes it is desirable that each one of the images so obtained on the photocathodes 13 be a different primary color component of the object 11. This can be accomplished in any suitable manner and in the system shown primary color components are derived as follows. The green component image passes through the red dichroic mirror 17 and the blue dichroic mirror 18 directly to the screen 13 of tube 15. The blue component image passes through red dichroic mirror 17 and is reflected by blue dichroic mirror 18 to reflecting mirror 19 which reflects it upon the photocathode 13 of tube 14. The red component is reflected by red dichroic mirror 17 to reflecting mirror 21 which reflects it to photocathode 13 of tube 16. It is thus apparent that the primary color component images of object 11 are continuously displayed on respective ones of the photocathodes of tubes 14, 15 and 16.

The component images are produced sequentially on the fluorescent screens 22 of respective ones of tubes 14, 15, and 16 as will be more fully described hereinafter. For this purpose circuits 24, 25, and 26 for applying operative voltages to the electron lens systems 23 of the image phototubes for controlled intervals of time are employed such, for example, as disclosed in my copending application Serial No. 172,370 filed July 6, 1950, entitled Electric Image Formation and Control. These circuits 24, 25, and 26, in turn, are controlled by synchronizing pulses which are generated in accordance with the sequential color system employed.

As an example of the operation of the invention if the frame sequential system is being used the camera tube 27 sweeps its target six complete times for each complete color picture. A complete picture is made up of successive red, blue, green, red, blue and green fields alternately interlaced as is well known in the art. By supplying synchronizing signals from the scanning circuits 29 at the beginning of each field to the pulse circuits in the order 26, 24, and 25 and having the output voltage of the pulse circuits in response thereto have a duration equal to the duration of one field, screens 22 of tubes 16, 14, and 15 will produce the desired sequential images during successive fields in accordance with the primary color component image displayed on the photocathode individual thereto. By employing a suitable optical system such as reflecting mirrors 31 and partially reflecting mirrors 32 the camera tube 27 will have the correct primary color component image impressed on its photo-target during each field scan.

It is obvious by this means that the signal from the camera tube 27 will be modulated sequentially in accordance with the primary color components of object 11 during successive field scans and this signal can be utilized to modulate transmitting means 28 in any conventional manner. The transmitting signal may contain pulse components in synchronism with the synchronizing signals supplied to circuits 24, 25, and 26 for obtaining proper synchronism at the receiver locations.

Figure 2:
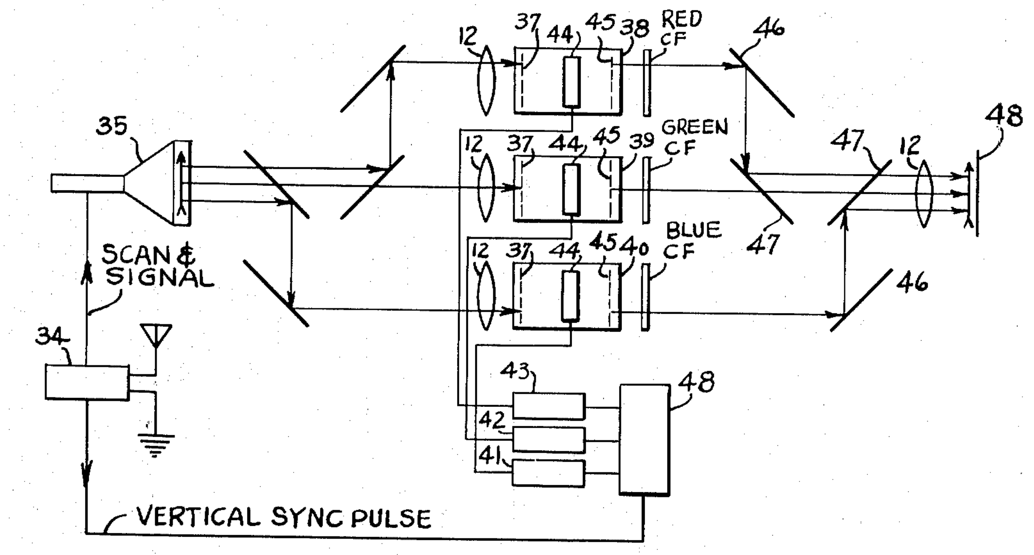
Fig. 2 is a block diagram showing the invention used to receive color television signals and to produce color images therefrom.

Referring now to Fig. 2, there is shown a television receiver adapted to display on a single scanned cathode-ray tube 35 the sequential component images corresponding to respective primary colors in accordance with the sequential system employed to produce the signals received. For signals of the field sequential system, for example the system as described in connection with Fig. 1, six complete fields will appear for each complete picture, namely, the sequence red, blue, green, red, blue and green alternately interlaced. The view of the cathode-ray tube 35 is continuously displayed on the photocathodes of the image phototubes 38, 39, and 40. Synchronizing signals received with the carrier signal are utilized to initiate the scanning means for tube 35 and to initiate pulse circuits 41, 42, and 43. The output of these pulse circuits then energizes the electron lens means 44 of tubes 38, 39, and 40 successively in the sequence of the color component images appearing on the face of the tube 35 and of a duration equal to a field scan as will be more fully described hereinafter.

The images produced on fluorescent screens 45 are in the same sequence as the component color images on the screen of tube 35. These images on screens 45 may be passed through a color filter CF of the color corresponding to the primary color component image displayed thereon and the resultant primary color images combined optically by means of reflecting mirrors 46 and dichroic mirrors 47 to provide the apparent full color image on screen 48. In place of the color filters CF the screens 45 may be such that they fluoresce in the proper respective primary color.

Figure 3:
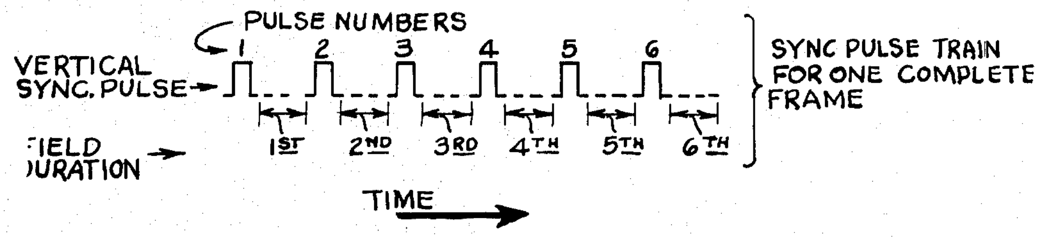
Fig. 3 is a diagram relating the synchronizing pulse train and the field durations for one frame.
Figure 4:
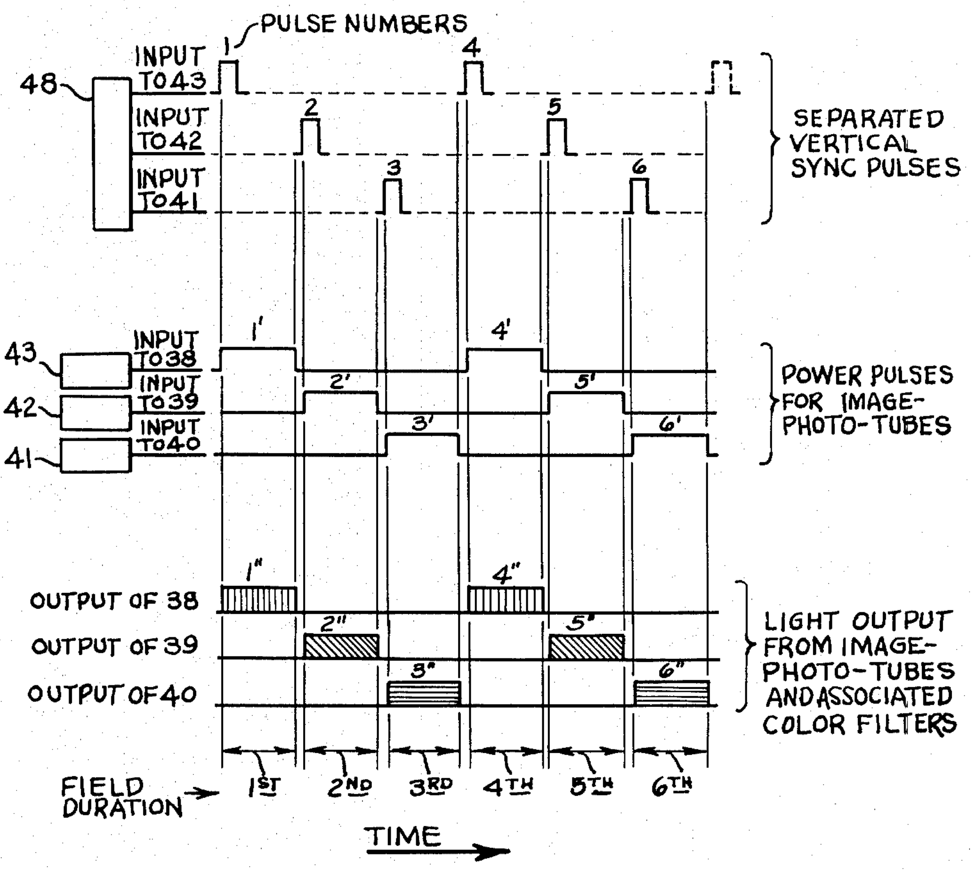
Fig. 4 is a timing diagram relating the electron lens operation and the image components.

The operation of the system will now be explained with reference to Figs. 2, 3, and 4. Video color component signals are received by receiver 34 to produce a black and white picture on the tube 35 corrseponding to the six successive color fields for a complete color picture. These signals are characterized by a vertical sync pulse at the beginning of each field as shown in Fig. 3. The synchronizing circuits 48 receive the vertical sync pulses and provide therefrom the sequential separated sync pulses of the primary colors. The individual power pulse circuits 41, 42, and 43 receive only the separated sync pulses corresponding to the color to be produced by the image photo tube driven thereby and produce the power pulses to the lens means 44 connected thereto. The duration of the power pulses is fixed such that the individual pulse ends after the last line of its associated field has been scanned and before the sync pulse of the next field is received by receiver 34.

The light output of tubes 38, 39, and 40 is coexistent with the power pulses except that a certain amount of light output will result from the persistence characteristic of the phosphor. If necessary, in any system, this persistence of light can be made long enough in duration to span the interval between power pulses and thereby eliminate any flicker that may otherwise exist. When the light images on the screens 45 are combined to produce a composite image, as by projection on screen 48, the illusion of a full color picture is obtained by the eye provided the complete sequence is repeated with a period that satisfies the persistence of the eye.

Obviously the present invention is not limited to the field sequential system described in detail but is equally applicable to other systems as the aforementioned dot or line sequential systems. The present invention is also applicable to simultaneous systems wherein an individual transmitting and receiving channel is utilized for each primary color. All that is required, as will be understood by those skilled in the art, for either the transmitter or receiver application of the IPT system is that the proper phototube lens be energized during the discrete increments of the scan which represent a particular color. Thus in the dot sequential system the three image tubes would be energized sychronously and sequentially with the dot sequence; and in the line sequential system, synchronously and sequentially with the line sequence.

While the invention has been described in connection with color television it is not intended that it be limited thereby since many modifications will be apparent to those skilled in the art in the light of the above teachings.

What I claim as new and desire to secure by Letters Patent of the United States is:

1. A system for producing the sequential components of image of a composite image of a view comprising a plurality of image phototubes each having a photocathode, electron lens means and a fluorescent screen, means for deriving the non-sequential image components of said composite image from said view, means for displaying said image components on respective ones of said photocathodes, means for deriving voltage gates synchronized with said sequential components, means responsive to said gates for operatively energizing respective ones of said lens means in sequence periodically and utilization means combining the sequential images of said image components produced on said screens during respective energizing periods of said electron lens means.

2. The system according to claim 1 in which said utilization means includes wave transmission means adapted to transmit signals modulated in response to said sequential images.

3. The system according to claim 2 and including wave receiving means for producing said composite image in response to said modulated signals received thereby.

4. The system according to claim 1 in which utilization means includes an optical system adapted to combine said sequential images to produce said composite image.

5. A system for producing a composite image of a view, said view being made up of a number of sequential components, comprising a plurality of image phototubes equal to said number and each having a photocathode, electron lens means and a fluorescent screen, means for displaying images of said view on the photocathodes of said tubes, means for deriving voltage gates synchronized with said sequential components means responsive to said gates for operatively energizing respective ones of said lens means periodically and synchronously with the sequence of said components thereby to produce fluorescent images of said components on respective ones of said screens, and means for combining said fluorescent images to form said composite image.

6. The combination according to claim 5 in which said components are primary color components and said screens fluoresce to produce respective ones of said primary colors corresponding to the color of the component image produced thereon.

7. The combination according to claim 5 in which said components are primary color components and said means for combining said fluorescent images includes filters of said primary colors for respective ones of said fluorescent images corresponding to the component color thereof.

8. A device for producing in predetermined sequence individual component images of a view comprising, in combination, a plurality of image phototubes equal to the number of said components each having a photocathode, electron lens means and a fluorescent screen, means for displaying on respective ones of said photocathodes an image of said view corresponding to at least one of said component images, means for deriving voltage gates synchronized with said sequential components and means responsive to said gates for operatively energizing said lens means of respective ones of said image phototubes in predetermined sequence whereby said displaying means and said lens energizing means providing said component images are produced on the fluorescent screens of said tubes respectively in said predetermined sequence.

9. A color television receiver comprising means including a scanned cathode-ray tube for producing a monochromatic fluorescent image composed of sequential component images corresponding to the primary colors of the object televised, an image phototube for each of said component images and having a photocathode, electron lens means and a fluorescent screen, means for displaying said fluorescent image on each of said photocathodes, means for deriving synchronizing signals corresponding to the sequence of said component images, means responsive to said synchronizing for operatively energizing the electron lens of respective ones of said image phototubes in accordance with the sequence of said component images and producing fluorescent images thereof on the respective screens of said phototubes, a primary color filter for each of the last mentioned images and of the color corresponding to the component image thereof and means including each said color filter for combining said last mentioned images into a full color image of said object.

10. Color television apparatus for providing a composite image having sequential primary color components comprising, in combination, a plurality of image phototubes each having a photocathode, electron lens means and a fluorescent screen, means for displaying on the respective photocathodes of said tubes optically separated primary color component images of the view of which the primary color component images are to be derived in predetermined sequence, means for deriving voltage gates synchronized with said sequential components means responsive to said gates for operatively energizing said lens means of respective ones of said image phototubes in said predetermined sequence whereby said component images are produced on the fluorescent screens of said tubes respectively in said predetermined sequence and optical means for combining said component images on said screens and producing said composite image therefrom and utilization means responsive to said composite image and producing said composite image therefrom.

11. Color television apparatus for providing an apparent full color visual image comprising a receiver including a scanned cathode-ray tube for producing a monochromatic fluorescent image composed of sequential component images corresponding to the primary colors of the object televised, means for deriving synchronizing signals related to and in the sequence of said components, means for separating said signals according to the primary colors related thereto, means for forming separate electron images of said monochromatic image, electroresponsive means for controlling individually said electron images, means responsive to the separated signals for energizing respective ones of said electroresponsive means synchronously with said sequential components and for a duration substantially equal thereto, means including fluorescent screens for producing individual visible images in said primary colors in response to said controlled electron images and means for combining said visible images into said apparent full color image.

12. The system according to claim 5 in which said fluorescent screens have a predetermined persistence of sufficient duration to make said composite picture appear continuously visible.

References Cited in the file of this patent

UNITED STATES PATENTS

| | | |
|---|---|---|
| 2,109,540 | Leishman | Mar. 1, 1938 |
| 2,219,113 | Ploke | Oct. 22, 1940 |
| 2,335,180 | Goldsmith | Nov. 23, 1943 |
| 2,378,746 | Beers | June 19, 1945 |
| 2,473,276 | Chew | June 14, 1949 |
| 2,493,200 | Land | Jan. 3, 1950 |
| 2,528,510 | Goldmark | Nov. 7, 1950 |
| 2,634,327 | Sziklai | Apr. 7, 1953 |